United States Patent
Wadell

[11] Patent Number: 5,174,436
[45] Date of Patent: Dec. 29, 1992

[54] FLEXIBLE MODULE CHAIN CONVEYOR

[75] Inventor: Lars G. A. Wadell, Aengelholm, Sweden

[73] Assignee: Nestec S. A., Vevy, Switzerland

[21] Appl. No.: 718,216

[22] Filed: Jun. 20, 1991

[30] Foreign Application Priority Data

Aug. 27, 1990 [EP] European Pat. Off. .......... 90116349

[51] Int. Cl.⁵ ............................................. B65G 17/10
[52] U.S. Cl. ...................................... 198/822; 198/852
[58] Field of Search ................................. 198/822, 852

[56] References Cited

U.S. PATENT DOCUMENTS

| | | | |
|---|---|---|---|
| 2,753,983 | 7/1956 | Bloomer | 198/822 |
| 3,169,633 | 2/1965 | Baker | 198/822 X |
| 3,297,144 | 1/1967 | Michaelson et al. | 198/822 X |
| 4,542,821 | 9/1985 | Livermore | 198/822 |
| 4,801,002 | 1/1989 | Gönner | 198/822 X |
| 4,840,269 | 6/1989 | Anderson | 198/822 |
| 4,991,710 | 2/1991 | Imatomi | 198/822 |

FOREIGN PATENT DOCUMENTS

| | | | |
|---|---|---|---|
| 2536 | 7/1956 | Fed. Rep. of Germany | 198/822 |
| 821051 | 9/1959 | United Kingdom | 198/822 |

Primary Examiner—D. Glenn Dayoan
Attorney, Agent, or Firm—Vogt & O'Donnell

[57] ABSTRACT

A conveyor has a plurality of overlapping modules having horizontal and vertical flexibility while forming a tight surface which are provided by chain links which include an articulated pivot which is connected by a spring to a module lug.

9 Claims, 1 Drawing Sheet

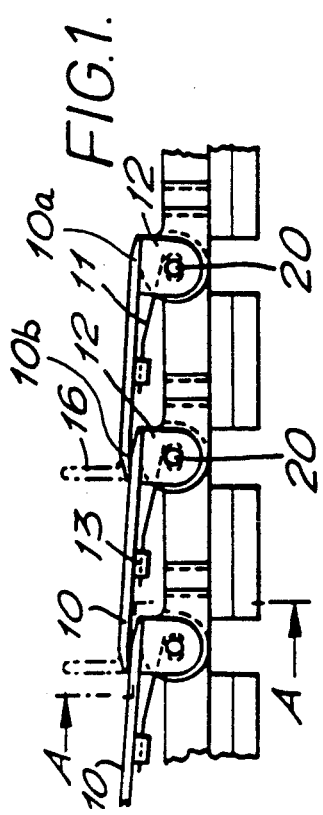
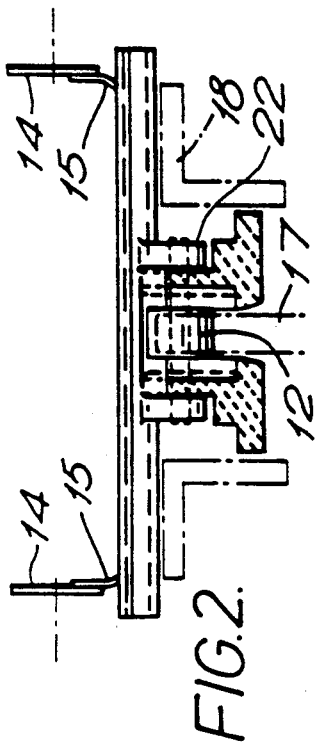
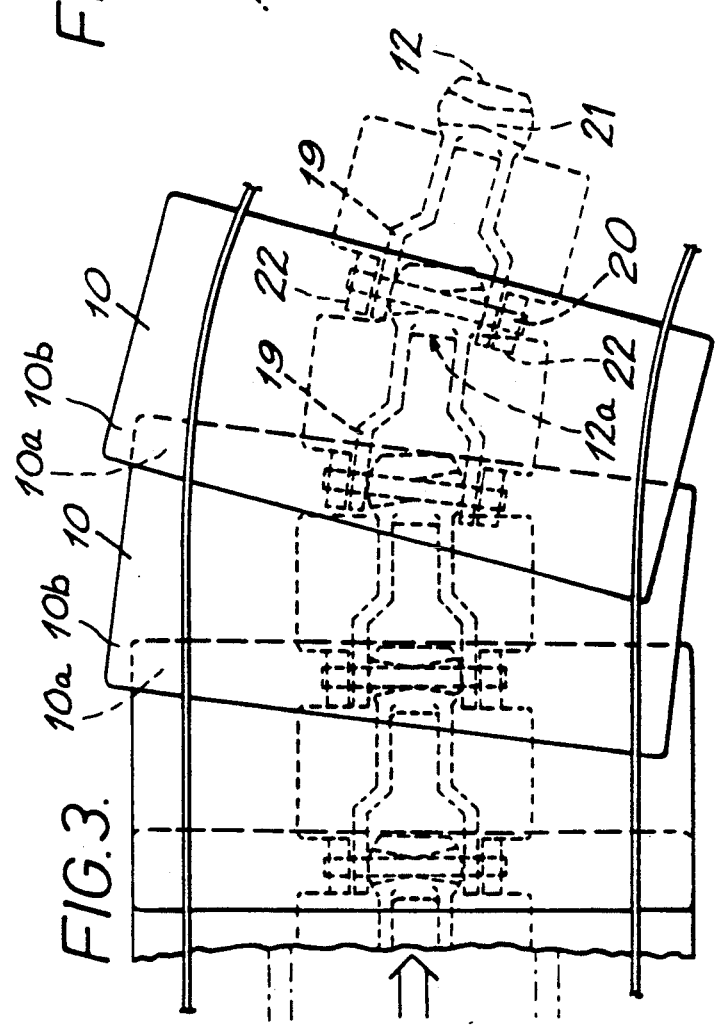
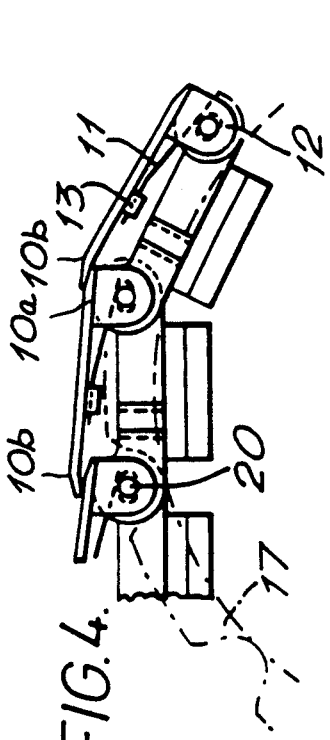
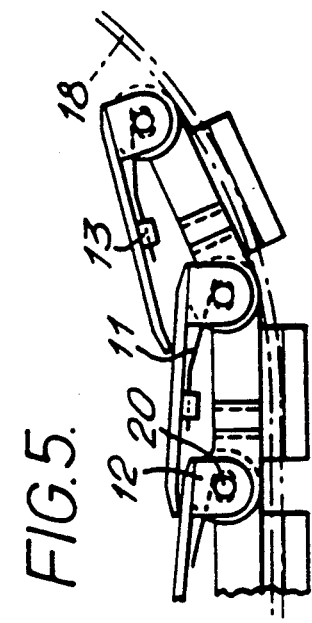

FLEXIBLE MODULE CHAIN CONVEYOR

BACKGROUND OF THE INVENTION

The present invention relates to conveyors more particularly to chain conveyors.

The horizontally and vertically flexible module top chains which are currently available can only be used for the transport of piece goods such as jars, bottles, etc., since the sections of the chain do not form a tight surface.

At the present time, the standard module top chains with a tight surface, suitable for the transport of small piece goods or granulated products, are only flexible in one direction and there are thus several critical transfer points where the goods are transferred from one conveyor to another.

SUMMARY OF THE INVENTION

The present invention provides a conveyor with a tight surface which is horizontally and vertically flexible and which thus eliminates many critical transfer points.

Accordingly, the present invention provides a conveyor having a horizontally and vertically flexible module top chain in which the modules are spring loaded and overlap one another to form a tight surface.

The horizontal and vertical flexibility is obtained by means of articulated pivots, for instance, claws cooperating with the chain links by means of shafts, enabling horizontal and vertical movement in any direction.

The conveyor may be provided with guide rails above the modules upper surface positioned laterally at or near their edges parallel to the direction of travel.

The modules may also be provided with an upright projection extending along an edge transverse to the direction of travel which serves as a carrier if the conveyor is inclined.

The modules of the chain are preferably molded from plastic.

The springs are extension springs, preferably leaf springs, each one extending from a chain link to the underside of a module.

The springs are preferably made of stainless steel.

Beneath the lateral edges of the modules, support rails are advantageously provided.

The present invention is illustrated by way of example only with reference to the accompanying drawings.

BRIEF DESCRIPTION OF THE DRAWINGS

FIG. 1 is a diagrammatic side sectional view of part of a conveyor of the present invention FIG. 2 is a transverse section along the lines A—A of FIG. 1 looking in the direction of the arrows FIG. 3 is a top plan view of part of a conveyor showing horizontal flexibility FIG. 4 and 5 are diagrammatic side sectional views of part of a conveyor of the present invention showing vertical flexibility in opposite directions.

DETAILED DESCRIPTION OF THE DRAWINGS

Referring to the drawings, the conveyor comprises overlapping modules having module support elements 10, urged into contact by means of leaf springs 11 extending from the articulated pivot of clain link head 12 to lugs 13 on the underside of the modules.

As can be seen from the drawing Figures, the module article support elements can be considered to have forward and rearward portions, designated 10a and 10b, respectively. As illustrated, a rearward bottom surface portion of each module article support element overlaps a forward top surface portion of an adjacent module article support element. Each of the plurality of clain links of the conveyor apparatus has a chain link head 12 which is positioned beneath each module element forward bottom surface and which has an articulated pivot, generally designated 12a. The springs 11 connect each module lug 13 to the articulated pivot positioned beneath the forward bottom surface portion of the module article supporting element to which the lug is connected. The springs urge the rearward bottom surface portion 10b of each module article support element 10 into contact with the forward top portion 10a of the adjacent module article support element and operate so that the modules are horizontally and vertically flexible in the manners shown by FIGS. 3–5.

As more particularly illustrated, the articulated pivot 12a is comprised of a shaft 20 positioned in an aperture 21 joint in the clain link head having a longitudinal axis transverse to a linear alignment of the chain link heads of the conveyor apparatus, the aperture being configured to enable horizontal and vertical flexibility and being configured, as illustrated, in an hour-glass-type configuration. As also illustrated, a pair of claws 19 extend from the chain link head 12 to the shaft 20 to connect the chain link head and shaft and complete formation of the chain links which are driven by sprocket 17 (FIG. 2).

As also illustrated, the conveyor apparatus includes rollers 22 positioned on the shafts 20, and as shown by FIG. 2, rails 23 may be positioned beneath the rollers. As also illustrated, the forward and rearward module article support element edges may have beveled edges to enhance mating engagement and tightness, as shown particularly in FIG. 4 wherein the rearward bottom edge surface and the forward top edge surface of the module article support elements are beveled for engagement. As also will be noted, the rearward top surface also is beveled.

Guide rails 14 are provided above the lateral edges of the modules 10 and made tight by rubber sealing strips 15. Carrier projections 16 extend along one of the transverse edges of each module 10.

As can be seen from FIGS. 3, 4 and 5, the conveyor is flexible in any horizontal or vertical direction and retains its tightness by the overlapping of the modules 10 held in place by the springs 11. It is suitable for transporting granulated materials without any substantial waste or spillage to higher or lower levels or to different horizontal positions.

I claim:
1. A conveyor apparatus comprising:
   a plurality of modules, each having an article support element for supporting articles to be conveyed, wherein a rearward bottom surface portion of each module article support element overlaps a forward top surface portion of an adjacent module article support element;
   a lug connected to the bottom surface portion of each module article support element positioned between the forward and rearward potions of the bottom surface;
   a plurality of chain links, each having a chain link head positioned beneath each forward bottom sur- face and having an articulated pivot positioned in the head; and a spring which connects each module lug to the articulated pivot positioned beneath the forward bottom surface of the module to which the lug is connected to urge the rearward bottom surface portion of each module article support element into contact with the forward top portion of the adjacent module article support element and so that the modules are horizontally and vertically flexible.

2. A conveyor apparatus according to claim 1 wherein the articulated pivot is comprised of a shaft positioned in an aperture in the chain link head having a longitudinal axis transverse to a linear alignment of the chain link heads.

3. A conveyor apparatus according to claim 2 wherein a pair of claws extend from the chain link head to the shaft to connect the chain link head and shaft.

4. A conveyor apparatus according to claim 1 further comprising support rails positioned beneath lateral edges of the module article support elements.

5. A conveyor apparatus according to claim 2 further comprising support rails positioned beneath lateral edges of the module article support elements.

6. A conveyor apparatus according to claim 1 further comprising a projection element extending from the module support element positioned on the module upper article support surface extending along an edge of the rearward portion of the module article support element.

7. A conveyor apparatus according to claim 2 further comprising a projection element extending from the module support element positioned on the module upper article support surface extending along an edge of the rearward portion of the module article support element.

8. A conveyor apparatus according to claim 1 wherein the spring is a leaf spring.

9. A conveyor apparatus according to claim 1 wherein forward and rearward edges of the module article support elements are beveled.

* * * * *

UNITED STATES PATENT AND TRADEMARK OFFICE
CERTIFICATE OF CORRECTION

PATENT NO. : 5,174,436
DATED : December 29, 1992
INVENTOR(S) : Lars G. A. WADELL It is certified that error appears in the above-identified patent and that said Letters Patent is hereby corrected as shown below:

Column 2, between lines 47 and 48, insert the following as a paragraph,

--Support rails 18 are provided beneath lateral edges of the modules.--

Signed and Sealed this

Twenty-sixth Day of October, 1993

Attest:

BRUCE LEHMAN

Attesting Officer

Commissioner of Patents and Trademarks